March 17, 1942.  D. L. HOFER  2,276,580
VELOCITY GAUGE
Filed Jan. 2, 1940

INVENTOR.
D. L. Hofer
BY Webster Webster
ATTORNEYS.

Patented Mar. 17, 1942

2,276,580

UNITED STATES PATENT OFFICE 2,276,580

VELOCITY GAUGE

David L. Hofer, Albany, Calif.

Application January 2, 1940, Serial No. 312,017

12 Claims. (Cl. 73—205)

This invention relates generally to a velocity gauge, and in particular the invention is directed to, and it is my principal object to provide, an improved gauge to register the velocity of the flow of a liquid through a pipe.

Another object of the invention is to provide an improved velocity gauge, of the type described, which is particularly adapted for use on the discharge pipe of a suction dredge, and to there serve as a means to indicate to the operator any abnormal use or fall in the velocity of the material being pumped through such discharge pipe.

A further object of the invention is to provide a velocity gauge including a novel electro-hydraulic mechanism arranged to be actuated in part by, and responsive to, the differential in the pressure of the liquid in the pipe at relatively widely spaced points.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
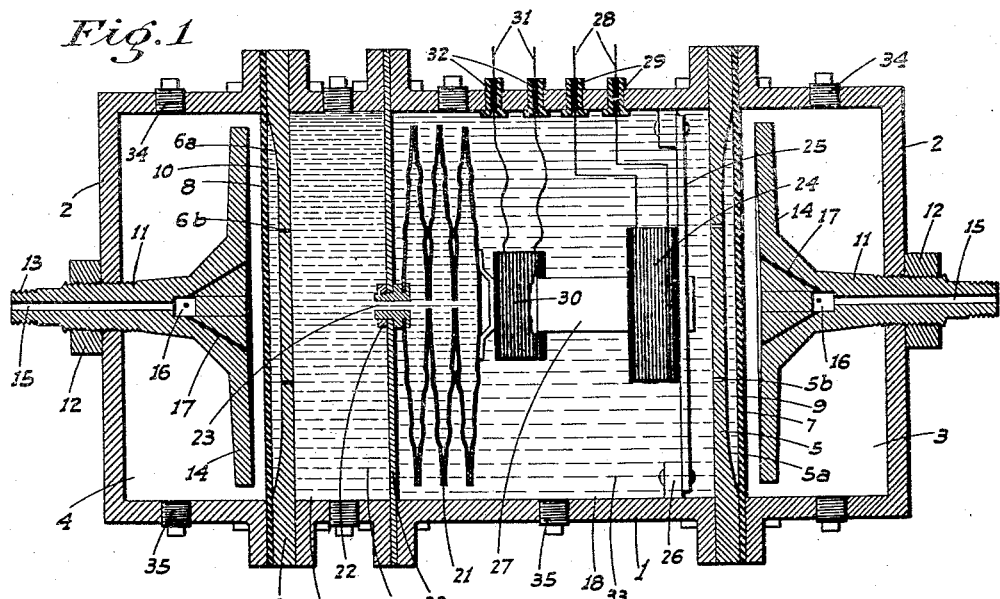
Figure 1 is a sectional elevation of the electrohydraulic mechanism of the device.
Figure 2:
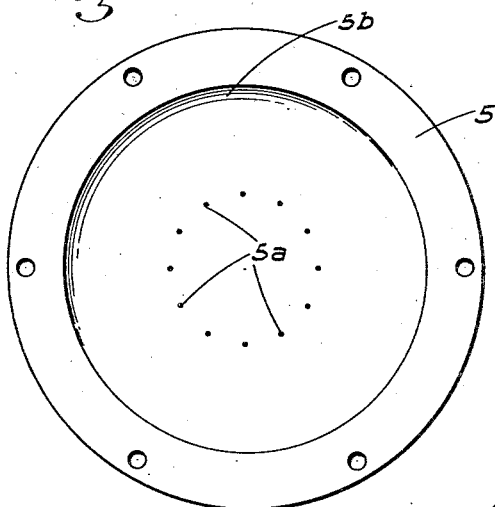
Figure 2 is an end view of one of the partitions formed with the pressure bleed holes therein.

Referring now more particularly to the characters of reference on the drawing, the device comprises an elongated housing or shell 1 preferably cylindrical in form and having closed ends 2; said shell being made in a number of sections, as shown, for ease of assembly of the parts of the device.

The end portions of shell 1 interiorly thereof are separated into chambers 3 and 4 by means of relatively thick rigid partitions 5 and 6, respectively. The opposite faces of partitions 5 and 6 are dished between the shell walls as indicated at 5a and 6a; these dished portions being covered by flexible diaphragms 7 and 8, respectively, and such diaphragms are mounted so as to seal chambers 3 and 4 from the pockets 9 and 10 which said dished portions and diaphragms form therebetween.

Figure 3:
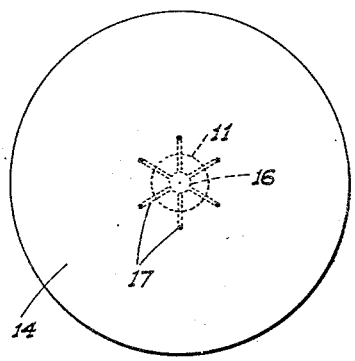
Figure 3 is an end view of one of the baffle discs or plates.
Figure 4:
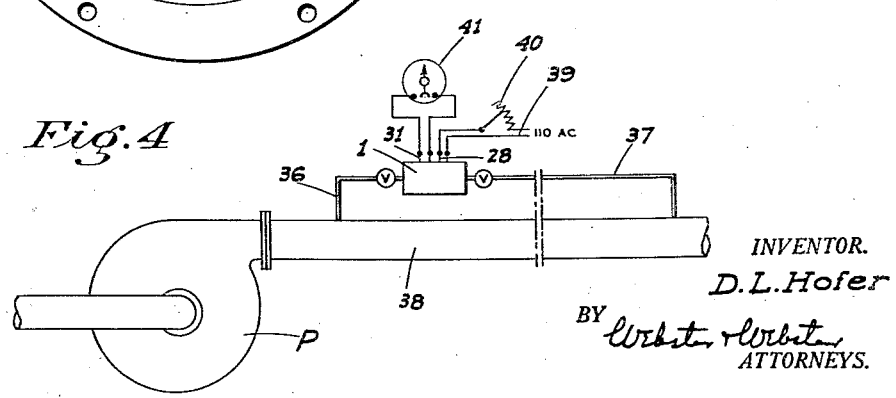
Figure 4 is a diagrammatic view of the device as mounted in connection with the discharge pipe of a pump.

A stem 11 projects axially through and is adjustably threaded in each end 2 of the shell 1, and is secured in place by a lock nut 12 threaded on the outer end thereof; said outer end being also threaded as at 13 for connection with a pipe fitting. The inner end of each stem 11 projects some distance into the corresponding chamber 3 or 4 and supports a radially disposed baffle disc 14 whose diameter is somewhat less than the internal diameter of the shell. These discs are spaced a predetermined distance from the adjacent diaphragms and for the purpose hereinafter set forth. A blind passage 15 extends into each stem, from its outer end, and at its inner end such passage is enlarged as at 16 and communicates with a number of diverging passages 17 which extend through and open to the inner face of disc 14 in a concentric circle as shown in Fig. 3. The reason for these diverging passages is to prevent a clean-out element from being inserted through passage 15 and into damaging engagement with the diaphragms.

The area within the shell between partitions 5 and 6 is separated into a relatively long chamber 18 and a relatively short chamber 19 by a third partition 20. The partition 5 is formed with bleed holes 5b to establish communication between chambers 9 and 18; while partition 6 includes bleed holes 6b to establish communication between chambers 10 and 19.

A multiple metallic bellows unit 21 is disposed in chamber 18 adjacent partition 20 for expanding movement lengthwise of said chamber; such bellows unit being supported from partition 20 by means of a hub 22 having a passage 23 therethrough and which establishes communication between chamber 19 and the interior of said unit.

A primary coil 24 is mounted in chamber 18 adjacent the end opposite the bellows unit 21, and is mounted in place by a bar 25 secured on and extending between opposed bosses 26 in said chamber. The coil is provided with a core 27 which projects therefrom toward the bellows unit and in axial alinement therewith. Current for coil 24 is supplied by lead wires 28 which lead into chamber 18 through suitable fittings 29. A ring-like secondary coil 30 is mounted on the free end of the bellows unit concentric with the axis thereof and adapted to slidably engage the core 27; said core initially projecting into coil 30 a short distance as shown. Lead wires 31 flexibly extend from coil 30 out of the shell through fittings 32.

Chambers 18 and 19, as well as pockets 9 and 10 in communication therewith are filled with a light grade of dielectric transformer oil 33; the bellows unit likewise being full of such oil due to its communication with chamber 19. The top of the shell is fitted with suitable filler plugs 34, while outlet or drain plugs 35 are provided in the bottom of the shell. The plugs 34 and 35 which lead into chambers 3 and 4 are removed only when necessary to flush out foreign matter such as silt which may accumulate due to the fact that said chambers are in communication with pipe 38 and filled with liquid therefrom.

In use, pipes 36 and 37 leading from relatively remote points on pipe 38, whose flow the device is to gauge, are connected with the stems 11 on the ends of shell 1; pipe 36 leading from pipe 38 from a point nearer the source of flow (as pump P) than pipe 37, and connecting with the stem which leads into chamber 4. Pipe 37 connects with the stem leading into chamber 3. Lead wires 28 are connected with a 110 volt A. C. circuit 39 which includes a voltage regulator 40 to assure a constant input; while lead wires 31 from coil 30 connect with the leads of an ammeter 41 whose scale is marked in feet per seconds to indicate the velocity of the flow in the pipe.

The velocity gauge functions in the following manner: Due to friction loss in pipe 38 between the intake point of pipes 36 and 37, there is a greater pressure in pipe 36 than in pipe 37; the proportionate difference in pressure depending on the velocity of the flow. The present device employs any variance in such proportionate difference in pressure to gauge velocity.

Liquid from pipe 38 is fed at the different pressure through pipes 36 and 37 into the corresponding end chambers in the shell and which chambers (3 and 4) fill with such liquid. The liquid in such chambers exerts a pressure on diaphragms 7 and 8, but as the pressure in chamber 4 is normally greater than in chamber 3, diaphragm 8 is deflected inward. As the oil in chamber 19 is non-compressible, the pressure exerted by the deflected diaphragm 8 displaces a certain amount of the oil from chamber 19 into bellows unit 21 normally expanding the same to a certain extent.

With such expansion of the bellows unit, secondary coil 30 has been moved into greater overlapping or overhanging position relative to core 27 of the primary coil 24 than when the device is idle. When coil 24 is energized, a current is induced in coil 30 and registers on ammeter 41; variance in the relative position of coil 30 to core 27 effecting a change in the amount of induced current in coil 30. Thus, if the velocity of flow in the pipe 38 varies, the relative pressures in chambers 3 and 4 will likewise vary and through the medium of diaphragms 7 and 8 will effect either an expansion or contraction of the bellows unit 21 and resultant relative movement of coil 30 relative to core 27; such movement correspondingly varying the induced current flowing to ammeter 41 which then indicates the velocity change in pipe 38. As previously indicated, the ammeter 41 is scaled by proper calculation to read in feet per seconds so as to give a direct reading on the velocity of the flow in pipe 38.

By virtue of the use of the dished partition on one side of each diaphragm and the baffle disc closely spaced from the other side thereof, it is impossible for excessive pressure or vacuum to "blow out" such diaphragms as movement thereof is limited in both directions. Further, to prevent rupture of the bellows unit, the capacity of pocket 10 is not greater than the expanded capocity of the bellows unit.

While I have described the plates 14 as being baffles, they actually serve as means to limit the expanding movement of the diaphragms, and the possible extent of such movement is determined by adjusting the plates axially by means of their threaded mounting in the ends of the shell.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A device to gauge the velocity of liquid flowing through a pipe, said device comprising an enclosed housing, separate supplies of non-compressible fluid in the housing, means enclosing each supply of said fluid and including a flexible diaphragm, a bellows in the housing, one supply of the fluid being arranged in communication with the interior of the bellows and the bellows being submerged in the other supply, means to subject one of the diaphragms to the pressure from the pipe at one point therein and to subject the other diaphragm to the pressure from the pipe at a relatively remote point therein, and instrumentalities, including a meter, associated with said bellows and actuated by the movement thereof.

2. A device to gauge the velocity of liquid flowing through a pipe, said device comprising an enclosed housing, means separating said housing into separate enclosed chambers, a bellows mounted in one chamber, the interior of the bellows being in communication with the other chamber, a non-compressible fluid filling each chamber and the bellows, a flexible diaphragm forming a part of each of said chambers, means to subject one of the diaphragms to the pressure from the pipe at one point therein and to subject the other diaphragm to the pressure from the pipe at a relatively remote point therein, an induction coil unit associated with the housing and including a movable coil, said coil being mounted for movement with the bellows, and separate means associated with the secondary coil of said induction unit and arranged to indicate the current flowing therethrough.

3. A device as in claim 2 in which the induction coil unit is mounted in said one chamber and submerged in the fluid therein, said fluid being a dielectric oil.

4. A device as in claim 2 in which the induction coil unit is mounted in said one chamber and submerged in the fluid therein, said fluid being a dielectric oil; and in which said induction coil unit includes a fixed primary coil having a projecting core, the movable coil being the secondary coil and mounted in connection with the bellows for sliding movement relative to said core.

5. A device to gauge the velocity of liquid flowing through a pipe, said device comprising an enclosed housing, a pair of spaced partitions forming end chambers in the housing, a third partition disposed intermediate said pair of partitions and separating the space therebetween into independent chambers, a bellows unit mounted in one of said independent chambers and arranged in communication with the other of said independent chambers, said independent chambers and the bellows being filled with a non-compressible fluid, flexible diaphragms sealed at their edges with the housing and engaging opposite faces of said pair of partitions, said partitions being dished adjacent the diaphragms and having bleed holes between said dished portions and the corresponding independent chambers, means to feed liquid from one point in said pipe to one of said end chambers, other means to feed liquid from a relatively remote point in said pipe to the other end chamber, and instrumentalities, including a meter, associated with said bellows and actuated by the movement thereof.

6. A device as in claim 5 including a baffle plate disposed in each end chamber in relatively closely spaced, face to face relation to the adjacent diaphragm.

7. A device to gauge the velocity of liquid flowing through a pipe, said device comprising an enclosed housing, a pair of spaced partitions forming end chambers in the housing, a third partition disposed intermediate said pair of partitions and separating the space therebetween into independent chambers, a bellows unit mounted in one of said independent chambers and arranged in communication with the other of said independent chambers, said independent chambers and the bellows being filled with a non-compressible fluid, flexible diaphragms sealed at their edges with the housing and engaging opposite faces of said pair of partitions, said partitions being dished adjacent the diaphragms and having bleed holes between said dished portions and the corresponding independent chambers, a tubular stem projecting axially through each end of the housing and extending in communicating relation into the corresponding end chamber, a baffle disc on the inner end of each stem disposed in relatively closely spaced, face to face relation to the adjacent diaphragm, means to feed liquid from one point in said pipe to one of said stems, other means to feed liquid from a relatively remote point in said pipe to the other of said stems, and instrumentalities, including a meter, associated with said bellows and actuated by the movement thereof.

8. A device as in claim 7 in which the passage through said stems terminates short of the inner face of the corresponding baffle disc; said discs including diverging passages leading from the corresponding stem passage to the inner face of said discs.

9. A device to gauge the velocity of liquid flowing through a pipe, said device comprising an enclosed housing, means separating said housing into separate enclosed chambers, a bellows mounted in one chamber, the interior of the bellows being in communication with the other chamber, a non-compressible fluid filling each chamber and the bellows, a flexible diaphragm forming a part of each of said chambers, means to subject one of the diaphragms to the pressure from the pipe at one point therein and to subject the other diaphragm to the pressure from the pipe at a relatively remote point therein, and instrumentalities, including a meter, associated with said bellows and actuated by the movement thereof.

10. A device to gauge the velocity of a fluid flowing through a pipe, said device comprising an enclosed housing, separate supplies of pressure transmitting fluid in said housing, each supply being partially walled by a flexible diaphragm, means to subject one diaphragm to the pressure in the pipe at one point, and to subject the other diaphragm to the pressure in the pipe at a spaced point, a differential pressure responsive mechanism in the housing, means in the housing positively sealing one of said supplies from the other, said means including said mechanism in part, said mechanism being responsive to differential in pressures transmitted through said diaphragms and separate supplies, and gauge means associated with and actuated by said mechanism; said supplies being a dielectric oil, and said mechanism being submerged in one supply and including an induction coil unit.

11. A velocity gauge comprising an enclosed housing, a differential pressure responsive mechanism mounted in said housing, said mechanism including a member responsive to differential pressures and an induction coil unit, separate supplies of dielectric liquid in the housing, means including said member positively sealing one supply from the other, said mechanism being responsive to differential in pressures transmitted through said separate supplies, means to separately subject said supplies to the pressure in a pipe at spaced points therein, while preventing intermingling of the pipe fluid with said supplies, and gauge means associated with and actuated by said coil unit.

12. A device to gauge the velocity of a fluid flowing through a pipe, said device comprising an enclosed housing, spaced diaphragms in the housing forming enclosed end chambers, means to subject one end chamber to the pressure from the pipe at one point therein and to subject the other end chamber to the pressure from the pipe at another point therein, a differential pressure responsive mechanism in the housing between said diaphragms, means including said mechanism in part separating the housing between said end chambers into other and separate chambers, one wall of each of which is formed by said diaphragms, separate supplies of pressure transmitting fluid filling said other chambers, and gauge means associated with said mechanism and actuated thereby.

DAVID L. HOFER.